(12) United States Patent
Shakespeare et al.

(10) Patent No.: US 8,926,798 B1
(45) Date of Patent: Jan. 6, 2015

(54) APPARATUS AND METHOD FOR MEASURING CROSS DIRECTION (CD) PROFILE OF MACHINE DIRECTION (MD) TENSION ON A WEB

(71) Applicant: Honeywell International, Inc., Morristown, NJ (US)

(72) Inventors: John F. Shakespeare, Hiltulanlahti (FI); Tarja T. Shakespeare, Hiltulanlahti (FI)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/175,716

(22) Filed: Feb. 7, 2014

(51) Int. Cl.
*D21F 11/00* (2006.01)

(52) U.S. Cl.
USPC ........... 162/198; 162/263; 700/127; 700/128; 700/129

(58) Field of Classification Search
USPC .................. 162/198, 263; 700/127, 128, 129
See application file for complete search history.

(56) References Cited

U.S. PATENT DOCUMENTS

| | | | | |
|---|---|---|---|---|
| 3,989,085 A | * | 11/1976 | Crosby | 162/198 |
| 4,874,467 A | * | 10/1989 | Karlsson et al. | 162/198 |
| 5,093,795 A | * | 3/1992 | Lewis | 700/129 |
| 5,262,955 A | * | 11/1993 | Lewis | 700/129 |
| 5,400,247 A | * | 3/1995 | He | 700/53 |
| 6,026,334 A | * | 2/2000 | Kayihan et al. | 700/28 |
| 6,281,679 B1 | | 8/2001 | King et al. | |
| 7,592,608 B2 | | 9/2009 | Shakespeare et al. | |
| 7,847,943 B2 | | 12/2010 | Hellstrom et al. | |
| 8,083,895 B2 | | 12/2011 | Alev et al. | |
| 2006/0237156 A1 | * | 10/2006 | Shakespeare et al. | 162/198 |
| 2006/0255300 A1 | * | 11/2006 | Shakespeare | 250/559.37 |
| 2010/0020168 A1 | | 1/2010 | Ye | |
| 2013/0098172 A1 | * | 4/2013 | Shakespeare | 73/863.92 |
| 2013/0289918 A1 | * | 10/2013 | Haran et al. | 702/97 |
| 2013/0329037 A1 | * | 12/2013 | Shakespeare et al. | 348/88 |

OTHER PUBLICATIONS

Pak Hui, "Laser Caliper Sensor Model 4213", Honeywell, Jun. 2005, 36 pages.
Frank M. Haran, et al., "System and Method for Correcting Caliper Measuremenmts of Sheet Products in Sheet Manufacturing or Processing Systems", U.S. Appl. No. 13/460,275, filed Apr. 30, 2012.
John F. Shakespeare et al. "Noncontact Caliper Measurements of Sheet Products Using Intersecting Lines in Sheet Manufacturing of Processing Systems", U.S. Appl. No. 13/492,404, filed Jun. 8, 2012.
Metso, "IRoll—the intelligent roll", Metso Technical Paper Series, Jan. 25, 2011, 13 pages.
VTT Information Technology: Runnability Services, "IQTension Portable", Jun. 12, 2013, 2 pages.

* cited by examiner

*Primary Examiner* — Mark Halpern (57) ABSTRACT

A method includes passing a web of material over a deflector having a backstep, where the backstep causes the web to deflect towards the deflector. The method also includes capturing measurements of one or more characteristics associated with the web at one or more locations downstream of the backstep. In addition, the method includes identifying a cross direction (CD) profile of machine direction (MD) tension on the web using the measurements. The method could further include generating a Coanda airflow between the web and the deflector. The measurements could include pressure measurements identifying air pressures in a space between the web and the deflector and/or deflection distance measurements identifying distances by which the web is deflected towards the deflector.

20 Claims, 3 Drawing Sheets

APPARATUS AND METHOD FOR MEASURING CROSS DIRECTION (CD) PROFILE OF MACHINE DIRECTION (MD) TENSION ON A WEB

TECHNICAL FIELD

This disclosure relates generally to measurement and control systems. More specifically, this disclosure relates to an apparatus and method for measuring the cross direction (CD) profile of machine direction (MD) tension on a web.

BACKGROUND

Sheets or other webs of material are used in a variety of industries and in a variety of ways. These materials can include paper, multi-layer paperboard, and other products manufactured or processed in long webs. As a particular example, long webs of paper can be manufactured and collected in reels. These webs of material are often manufactured or processed at high rates of speed, such as speeds of up to one hundred kilometers per hour or more. It is often necessary or desirable to measure one or more properties of a web of material as the web is being manufactured or processed.

SUMMARY

This disclosure provides an apparatus and method for measuring the cross direction (CD) profile of machine direction (MD) tension on a web.

In a first embodiment, a method includes passing a web of material over a deflector having a backstep, where the backstep causes the web to deflect towards the deflector. The method also includes capturing measurements of one or more characteristics associated with the web at one or more locations downstream of the backstep. The method further includes identifying a cross direction (CD) profile of machine direction (MD) tension on the web using the measurements.

In a second embodiment, an apparatus includes a deflector, which has first and second portions having different heights and separated by a backstep. The backstep is configured to cause a web of material to deflect towards the deflector when passing over the deflector. The deflector also includes a slot through the first portion of the deflector. The slot is configured to deliver an airflow between the web and the deflector. The deflector further includes at least one measurement tap through the second portion of the deflector. The at least one measurement tap is configured to allow at least one sensor to capture measurements of one or more characteristics associated with the web.

In a third embodiment, a system includes a deflector, which has first and second portions having different heights and separated by a backstep. The backstep is configured to cause a web of material to deflect towards the deflector when passing over the deflector. The deflector also includes a slot through the first portion of the deflector. The slot is configured to deliver an airflow between the web and the deflector. The deflector further includes at least one measurement tap through the second portion of the deflector. The system also includes at least one sensor configured to capture measurements of one or more characteristics associated with the web through the at least one measurement tap.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
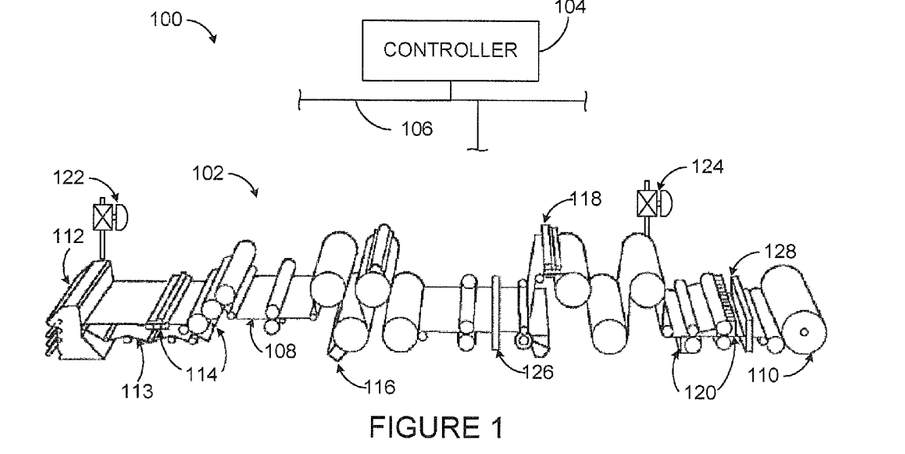
FIG. 1 illustrates an example web manufacturing or processing system according to this disclosure.

FIG. 1 illustrates an example web manufacturing or processing system 100 according to this disclosure. As shown in FIG. 1, the system 100 includes a paper machine 102, a controller 104, and a network 106. The paper machine 102 includes various components used to produce a paper product, namely a paper web 108 that is collected at a reel 110. The controller 104 monitors and controls the operation of the paper machine 102, which may help to maintain or increase the quality of the paper web 108 produced by the paper machine 102.

In this example, the paper machine 102 includes at least one headbox 112, which distributes a pulp suspension uniformly across the machine onto a continuous moving wire screen or mesh 113. The pulp suspension entering the headbox 112 may contain, for example, 0.2-3% wood fibers, fillers, and/or other materials, with the remainder of the suspension being water. The headbox 112 may include an array of dilution actuators, which distributes dilution water into the pulp suspension across the web. The dilution water may be used to help ensure that the resulting paper web 108 has a more uniform basis weight across the web 108.

Arrays of drainage elements 114, such as vacuum boxes, remove as much water as possible to initiate the formation of the web 108. An array of steam actuators 116 produces hot steam that penetrates the paper web 108 and releases the latent heat of the steam into the paper web 108, thereby increasing the temperature of the paper web 108 in sections across the web. The increase in temperature may allow for easier removal of remaining water from the paper web 108. An array of rewet shower actuators 118 adds small droplets of water (which may be air atomized) onto the surface of the paper web 108. The array of rewet shower actuators 118 may be used to control the moisture profile of the paper web 108, reduce or prevent over-drying of the paper web 108, or correct any dry streaks in the paper web 108.

The paper web 108 is then often passed through a calender having several nips of counter-rotating rolls. Arrays of induction heating actuators 120 heat the shell surfaces of various ones of these rolls. As each roll surface locally heats up, the roll diameter is locally expanded and hence increases nip pressure, which in turn locally compresses the paper web 108. The arrays of induction heating actuators 120 may therefore be used to control the caliper (thickness) profile of the paper web 108. The nips of a calender may also be equipped with other actuator arrays, such as arrays of air showers or steam showers, which may be used to control the gloss profile or smoothness profile of the paper web.

Two additional actuators 122-124 are shown in FIG. 1. A thick stock flow actuator 122 controls the consistency of incoming stock received at the headbox 112. A steam flow actuator 124 controls the amount of heat transferred to the paper web 108 from drying cylinders. The actuators 122-124 could, for example, represent valves controlling the flow of stock and steam, respectively. These actuators may be used for controlling the dry weight and moisture of the paper web 108.

Additional components could be used to further process the paper web 108, such as a supercalender (for improving the paper web's thickness, smoothness, and gloss) or one or more coating stations (each applying a layer of coatant to a surface of the paper to improve the smoothness and printability of the paper web). Similarly, additional flow actuators may be used to control the proportions of different types of pulp and filler material in the thick stock and to control the amounts of various additives (such as retention aid or dyes) that are mixed into the stock.

This represents a brief description of one type of paper machine 102 that may be used to produce a paper product. Additional details regarding this type of paper machine 102 are well-known in the art and are not needed for an understanding of this disclosure. Also, this represents one specific type of paper machine 102 that may be used in the system 100. Other machines or devices could be used that include any other or additional components for producing a paper product. In addition, this disclosure is not limited to use with systems for producing paper products and could be used with systems that process a paper product or with systems that produce or process other items or materials (such as multi-layer paperboard, cardboard, plastic, textiles, metal webs, or other or additional materials that are manufactured or processed as moving webs).

In order to control the paper-making process, one or more properties of the paper web 108 may be continuously or repeatedly measured. The web properties can be measured at one or various stages in the manufacturing process. This information may then be used to adjust the paper machine 102, such as by adjusting various actuators within the paper machine 102. This may help to compensate for any variations of the web properties from desired targets, which may help to ensure the quality of the web 108.

As shown in FIG. 1, the paper machine 102 includes one or more scanners 126-128, each of which may include one or more sensors. Each scanner 126-128 is capable of measuring one or more characteristics of the paper web 108. For example, each scanner 126-128 could include sensors for measuring the tension, caliper, anisotropy, basis weight, color, gloss, sheen, haze, surface features (such as roughness, topography, or orientation distributions of surface features), or any other or additional characteristics of the paper web 108.

Each scanner 126-128 includes any suitable structure or structures for measuring or detecting one or more characteristics of the paper web 108, such as one or more sets of sensors. The use of scanners represents one particular embodiment for measuring web properties. Other embodiments could be used, such as those including one or more stationary sets or arrays of sensors, deployed in one or a few locations across the web or deployed in a plurality of locations across the whole width of the web such that substantially the entire web width is measured.

The controller 104 receives measurement data from the scanners 126-128 and uses the data to control the paper machine 102. For example, the controller 104 may use the measurement data to adjust any of the actuators or other components of the paper machine 102. The controller 104 includes any suitable structure for controlling the operation of at least part of the paper machine 102, such as a computing device.

The network 106 is coupled to the controller 104 and various components of the paper machine 102 (such as the actuators and scanners). The network 106 facilitates communication between components of the system 100. The network 106 represents any suitable network or combination of networks facilitating communication between components in the system 100. The network 106 could, for example, represent a wired or wireless Ethernet network, an electrical signal network (such as a HART or FOUNDATION FIELDBUS network), a pneumatic control signal network, or any other or additional network(s).

In the following description, two directions are referenced with respect to the web 108. The cross direction (CD) of the web 108 denotes the direction across the (shorter) width of the web 108. The machine direction (MD) of the web 108 denotes the direction along the (longer) length of the web 108. Also, MD tension refers to tension applied to the web 108 along the length of the web 108 in the machine direction. A CD profile of MD tension refers to the MD tension as measured at different locations across the width of the web 108 in the cross direction.

The CD profile of MD tension on the web 108 can be indicative of the probability of a web break occurring. MD tension is typically very small near the edges of a web and larger away from the edges of the web. If the edge tension becomes too small, the probability of a web break, such as due to path instability, increases. Also, if the maximum MD tension on the web becomes too large, the web may break due to its yield strength being exceeded (such as when plastic deformation occurs if the moisture content is higher).

In one conventional approach, a system with a dedicated frame deflects a web over a beam having a curved cross-section and measures tension using an array of parallel detectors. However, this type of system occupies a similar amount of space as a conventional scanner while only providing tension measurements (a conventional scanner can often measure multiple web properties simultaneously). This type of system is also relatively expensive to manufacture, install, and maintain, and it can be unreliable near the web's edges.

In another conventional approach, a system with a dedicated turning roll is equipped with sensors over the surface of the turning roll. Although this does not necessarily occupy excessive space in a machine, it needs to be designed and built into the machine from the outset. It is also relatively expensive to manufacture, install, and maintain.

As described in more detail below, one or more scanners 126-128 are configured to measure the CD profile of the MD tension on the web 108. The web 108 travels over a backstep of a deflector, and a Coanda airflow can be generated between the deflector and the web 108. Pressure, deflection distance, or other measurements captured after the backstep can be used to identify the CD profile of MD tension on the web 108. The measurements could be captured using a scanning head or sensor carriage that moves back and forth across the width of the web 108. The CD profile could be expressed in any suitable form, such as by using absolute tension values across the web 108 or variations in tension across the web 108.

Depending on the implementation, this approach can have various advantages compared to conventional systems. For example, this approach may not require any space beyond that already used for other scanning measurements. For instance, tension measurements could be captured along with optical caliper measurements using the same scanning system. Even if used only for tension measurements, this approach can cost substantially less than the cost of an entire beam. Moreover, since a scanning system that traverses the web 108 can be used, a single calibration can suffice for the entire CD profile. Further, deflections can be measured with a high degree of accuracy, such as within several microns. In addition, cleaning can be greatly reduced or simplified, such as when one or a few measurement taps at most are cleaned.

Additional details of devices for measuring the CD profile of MD tension on a web are provided below. Note that while these devices may be described as being implemented within the scanner 126 or 128 of the system 100, these devices could be used at any other suitable location(s) within the system 100 or in any other suitable systems.

Although FIG. 1 illustrates one example of a web manufacturing or processing system 100, various changes may be made to FIG. 1. For example, other systems could be used to produce other paper or non-paper products. Also, while shown as including a single paper machine 102 with various components and a single controller 104, the system 100 could include any number of paper machines or other machinery having any suitable structure, and the system 100 could include any number of controllers. In addition, FIG. 1 illustrates one example operational environment in which measuring the CD profile of MD tension on a web can be used. This functionality could be used in any other suitable system.

Figure 2A:
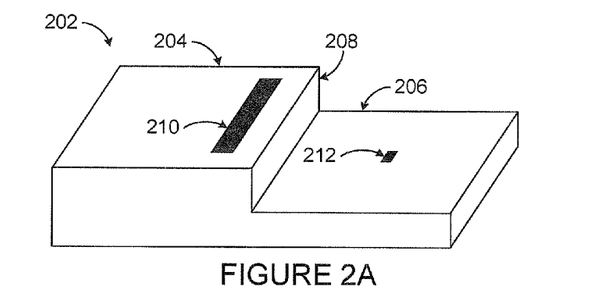
FIGS. 2A and 2B illustrate a first example apparatus for measuring the cross direction (CD) profile of machine direction (MD) tension on a web according to this disclosure.
Figure 2B:
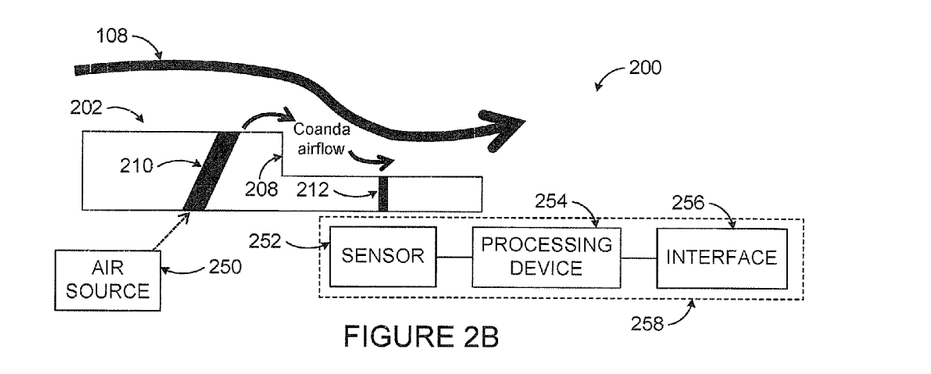

FIGS. 2A and 2B illustrate a first example apparatus 200 for measuring the CD profile of MD tension on a web according to this disclosure. In particular, FIG. 2A illustrates an example deflector 202 for a web, and FIG. 2B illustrates the apparatus 200 with a cross-section of the deflector 202 along with additional components.

As shown in FIG. 2A, the deflector 202 includes a taller portion 204 and a shorter portion 206.

A backstep 208 is defined between the portions 204-206 of the deflector 202. Although the backstep 208 here is shown as forming right angles with the portions 204-206, other angles or rounded edges or sides could be used. The height of the backstep 208 can be selected to have any suitable value, such as a minimum height of about 0.5 mm to about 2.0 mm.

The deflector 202 also includes a slot 210 and a measurement tap 212. The slot 210 extends across part or all of the deflector 202. The slot 210 represents an opening through the deflector 202. As described below, a Coanda airflow can be created by providing air through the slot 210, which is located upstream of the backstep 208. The slot 210 can have any suitable size suitable for providing an airflow. For example, the slot 210 could be at least about 5.0 cm or at least about 10.0 cm in width (measured left to right in FIG. 2A). The slot 210 can be substantially parallel with the backstep 208, and both the backstep 208 and the slot 210 can be substantially perpendicular to the web's direction of travel. The slot 210 could also be positioned so that the backstep 208 is relatively close to the output end of the slot 210, such as within about 1.0 cm of the backstep 208.

The measurement tap 212 extends through the deflector 202 vertically. The measurement tap 212 denotes a location spaced apart from the backstep 208 where pressure, deflection distance, or other characteristics can be measured. The measurement tap 212 can have any suitable size suitable for capturing pressure, deflection distance, or other measurements. For instance, the measurement tap 212 could include a circular or other hole, a rectangular or other slot extending in the machine direction, or a rectangular or other slot extending in the cross direction.

The deflector 202 could be formed from any suitable material(s) and in any suitable manner. The slot 210 and the measurement tap 212 could also be formed in any suitable manner. For example, the deflector 202 could be cast, machined, or otherwise fabricated substantially into the form as shown in FIG. 2A (including the slot 210 and the measurement tap 212). The deflector 202 could also be cast or otherwise fabricated into a single block of material, and the slot 210 and the measurement tap 212 could be formed through the block (such as by etching or drilling).

As shown in FIG. 2B, the slot 210 can follow a vertical path that is formed at an oblique angle with respect to the top and bottom surfaces of the deflector 202. Also, the measurement tap 212 can follow a path that is formed at a right angle with respect to the top and bottom surfaces of the deflector 202. Note, however, that neither of these is necessarily required.

An air source 250 supplies a flow of air through the slot 210. This creates a Coanda airflow between the deflector 202 and a web 108. Among other things, this airflow can help to keep the web 108 from contacting the deflector 202. This airflow, along with the presence of the backstep 208, can also help to deflect the web 108 around the backstep 208. In some embodiments, the air source 250 could supply a substantially constant flow of air to the slot 210. The air source 250 includes any suitable structure configured to deliver a flow of air. In other embodiments, the flow of air can be dependent on the speed at which the web 108 travels over the backstep 208.

When the web 108 travels over the deflector 202, the change in height of the deflector 202 (possibly along with the Coanda airflow) causes the web 108 to be deflected downward towards the deflector 202. This occurs in the region of the deflector 202 around and downstream of the backstep 208.

One or more sensors 252 capture measurements associated with the web 108 at the measurement tap 212. For example, the sensor(s) 252 could capture pressure measurements of the air pressure in the space between the web 108 and the deflector 202. In general, a higher MD tension on the web 108 results in lower air pressures measured after the backstep 208, while a lower MD tension on the web 108 results in higher air pressures measured after the backstep 208. The sensor(s) 252 could also or alternatively capture distance measurements from the sensor(s) 252 to the web 108, where the distance measurements are indicative of an amount of deflection of the web 108. In general, a higher MD tension on the web 108 results in less deflection measured after the backstep 208, while a lower MD tension on the web 108 results in higher deflection measured after the backstep 208. Each sensor 252 includes any suitable structure for measuring one or more characteristics.

The sensor measurements can be used in any suitable manner. In this example, the sensor measurements are provided to at least one processing device 254, which analyzes the sensor measurements. For instance, the processing device(s) 254 could implement an analysis function to analyze the sensor measurements and identify a current CD profile of MD tension on the web 108. The processing device(s) 254 could then output the CD profile, such as via at least one interface 256, or use the CD profile in some manner. For example, the processing device(s) 254 could implement control logic that uses the CD profile to adjust one or more actuators in the machine 102 or other web-making or web-processing system. The control logic could be used to generate control signals that can be output via the interface(s) 256.

Each processing device 254 represents any suitable processing or computing device, such as a microprocessor, microcontroller, digital signal process, field programmable gate array, application specific integrated circuit, or discrete circuitry. Each interface 256 includes any suitable structure facilitating communication with at least one external device or system, such as via a wired or wireless network or via a direct electrical or wireless connection.

In particular embodiments, the sensor(s) 252 and possibly the processing device(s) 254 and the interface(s) 256 could be located on or within a scanning head or sensor carriage 258. The scanning head or sensor carriage 258 denotes a structure that can be moved back and forth over the web 108 in order to capture measurements at different positions across the width of the web 108. Note that multiple scanning heads or sensor carriages 258 could also be used, such as one above the web 108 and one below the web 108. Here, the sensor(s) 252 could be placed in the upper or lower scanning head or sensor carriage 258.

In some embodiments, the apparatus 200 operates using pressure measurements from the sensor(s) 252. The pressure beneath the web 108 at a short distance from the backstep 208 can depend on a number of parameters related to the grade of the web 108 and the operation of the machine 102. However, variations in pressure across the width of the web 108 also depend on the local MD tension on the web 108. Thus, capturing pressure measurements across the width of the web 108 and identifying differences in those pressure measurements can be used to identify differences in tension across the width of the web 108.

In other embodiments, the apparatus 200 operates using distance measurements from the sensor(s) 252. The amount of deflection of the web 108 at a short distance from the backstep 208 can depend on a number of parameters related to the grade of the web 108 and the operation of the machine 102. However, variations in the web's deflection across the width of the web 108 also depend on the local MD tension on the web 108. Thus, capturing distance measurements across the width of the web 108 and identifying differences in those distance measurements can be used to identify differences in tension across the width of the web 108.

In still other embodiments, both pressure and distance measurements can be captured by the sensors 252 and used to identify differences in tension across the width of the web 108. Note that while a single measurement tap 212 could be used to capture both pressure and distance measurements, pressure and distance measurements could also be captured at different distances from the backset 208 via different measurement taps 212.

In particular embodiments, the measurement tap 212 can be located between the web's expected point of inflection and the web's expected point of maximum deflection. This may be useful, for example, when only pressure or only distance measurements are used. In those cases, it may be desirable to avoid being too close to the web's point of maximum deflection.

The measurement tap 212 could also be equipped with a mechanism for intermittently cleaning the measurement tap 212. For example, the measurement tap 212 could be equipped with an outward airflow that is normally blocked. However, if the scanning apparatus occasionally goes off-web (is no longer positioned over or under the web 108 for a measurement), the airflow could be unblocked so that the measurement tap 212 is cleaned with a "sneezing" action. This could be particularly useful in dusty environments or if the web 108 sheds dust, filler materials, or other constituents. In particularly unclean environments, the measurement tap 212 could be cleaned at each end of a scan across the web 108.

Figure 3:
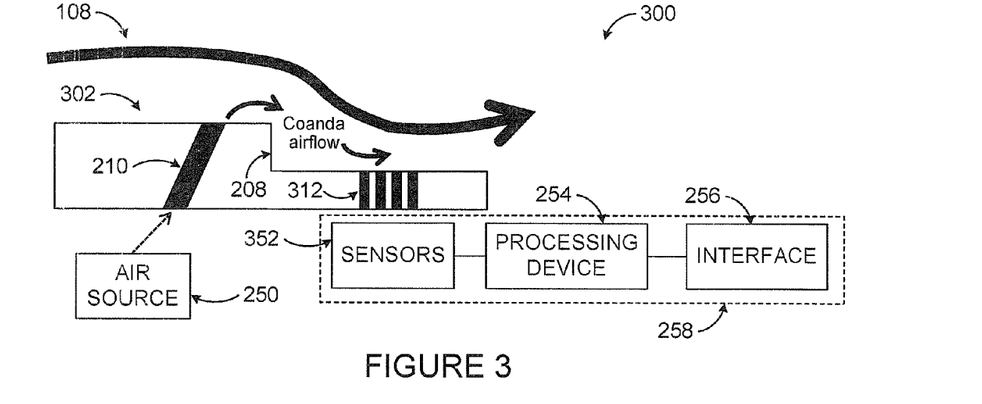
FIG. 3 illustrates a second example apparatus for measuring the CD profile of MD tension on a web according to this disclosure.

FIG. 3 illustrates a second example apparatus 300 for measuring the CD profile of MD tension on a web according to this disclosure. The apparatus 300 is similar in structure to the apparatus 200 described above. The apparatus 300 here uses a deflector 302 having the backstep 208 and the slot 210. The apparatus 300 also includes the air source 250, the processing device(s) 254, the interface(s) 256, and possibly the scanning head or sensor carriage 258.

In this example, the deflector 302 includes multiple measurement taps 312, and multiple sensors 352 could be used to capture measurements using the multiple measurement taps 312. The measurement taps 312 could include circular or other holes, rectangular or other slots extending in the machine direction, rectangular or other slots extending in the cross direction, or any other collection of measurement taps. The measurement taps 312 could have any suitable arrangement, such as equal or unequal spacings, as well as equal or unequal sizes. The sensors 352 represent one or more sensors that can be used to measure pressure, deflection distance, or other characteristics via the measurement taps 312. The sensors 352 could include separate sensors or sensors forming part of a sensor array.

The use of multiple measurement taps 312 at different distances from the backstep 208 (and the associated sensor measurements at those measurement taps 312) could allow the CD profile of MD tension on the web 108 to be determined more robustly. For example, by using pressure measurements at multiple measurement taps 312, the evolution of the pressure under the web 108 can be determined over a short distance spanned by multiple measurement taps 312, and the evolution of pressure can depend on the local MD tension. Variations in pressure across the web 108 can be used to identify the CD profile of MD tension on the web 108.

Similarly, the web's actual deflection path can be determined over a short distance spanned by multiple measurement taps 312. Both the maximum deflection and the shape of the deflection (such as its greatest slope) can indicate the local MD tension, and variations in these measured parameters across the web 108 can be used to identify the CD profile of MD tension on the web 108.

Once again, both pressure and deflection distance can be measured by the apparatus 300, each at one or more locations. The pressure and deflection distance measurements may or may not occur at the same distance(s) from the backstep 208.

In particular embodiments, the locations of the measurement taps 312 could span from the web's expected point of inflection to near or beyond the web's expected point of maximum deflection. This could allow the evolution of pressure and/or the actual deflection path to be determined over an adequate range.

As noted above, the CD profile identified by the processing device(s) 254 could be expressed in terms of absolute tension values or as variations in tension across the width of the web 108. In order to calculate the absolute tension on the web 108 in a specific location, the processing device(s) 254 could be configured to precisely control the airflow from the air source 250. This precise control can allow calculations to be performed based on knowledge of the airflow under the web 108.

Figure 4:
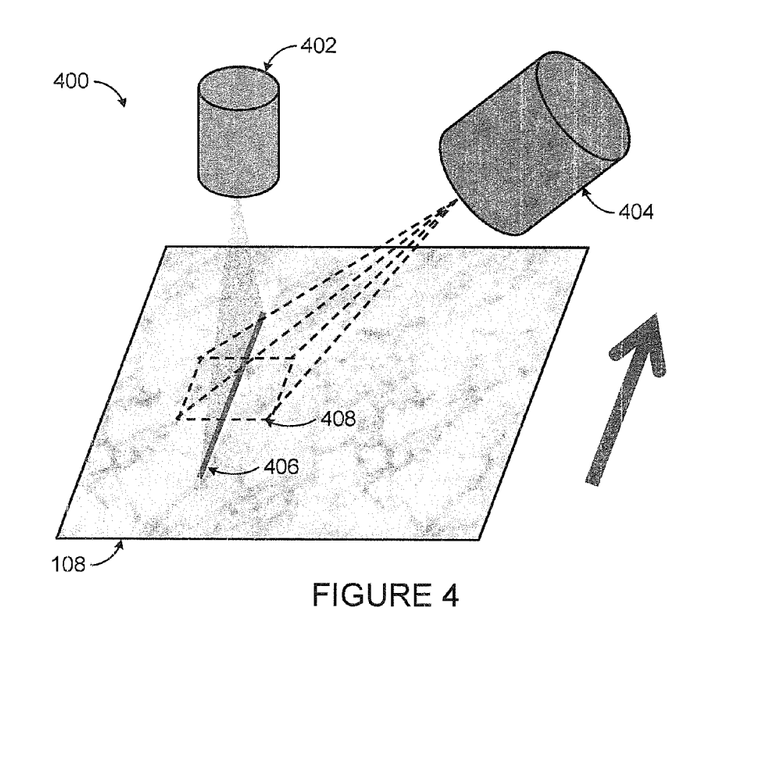
FIG. 4 illustrates an example deflection distance sensor that facilitates determining the CD profile of MD tension on a web according to this disclosure.

FIG. 4 illustrates an example deflection distance sensor 400 that facilitates determining the CD profile of MD tension on a web according to this disclosure. This sensor 400 could be used as the sensor 252 or as one of the sensors 352 in the apparatus 200, 300.

The sensor 400 in this example uses an image-based technique to determine distances to the web 108 at multiple locations downstream from the backstep 208. The sensor 400 here includes a projector 402 and an imager 404. The projector 402 projects a line 406 or other image onto the web 108, and the imager 404 captures an image of a portion 408 of the web 108. The line 406 could be arranged so that it is substantially parallel with the web's direction of travel. The projector 402 includes any suitable structure configured to project a line or other image onto a web, such as a laser and suitable optics. The imager 404 includes any suitable structure for capturing an image, such as a CMOS, CCD, or other digital camera.

The distance(s) from the imager 404 to the web 108 (and hence the deflection of the web 108) can be determined from the image of the line 406 and its deviation from straightness. For example, the processing device(s) 254 or processing functionality within a sensor 252, 352 could analyze the image and estimate distances of the web 108 from the deflector 202, 302 at one or more locations.

In particular embodiments, the line 406 is projected normal to the surface of the web 108 in the cross direction, and the optical axis of the imager 404 is at an angle to normal in the cross direction. In other particular embodiments, the optical axis of the imager 404 can be normal to the surface of the web 108 in the cross direction, and the line 406 can be projected at an angle to normal in the cross direction. In both cases, the orientation of both the projector 402 and the imager 404 can be normal to the surface of the web 108 in the machine direction.

As can be seen in FIG. 4, it is possible to use a single measurement tap to collect measurements associated with multiple distances from the backstep 208. In FIG. 4, an image could be obtained through a single measurement tap, and the image could be used to calculate the distance of the web 108 from the deflector 202, 302 at multiple locations. As a result, the number of measurement taps and the location(s) of the measurement tap(s) can be based, at least in part, on the type(s) of sensor(s) being used and the characteristic(s) being measured.

Although FIGS. 2A through 3 illustrate examples of apparatuses 200, 300 for measuring the CD profile of MD tension on a web, various changes may be made to FIGS. 2A through 3. For example, the functional division shown for each apparatus is for illustration only. Various components in each apparatus could be combined, further subdivided, or omitted and additional components could be added according to particular needs.

Although FIG. 4 illustrates one example of a deflection distance sensor 400 that facilitates determining the CD profile of MD tension on a web, various changes may be made to FIG. 4. For example, the sensor 400 shown in FIG. 4 represents one type of distance sensor. Any other suitable distance sensor could be used to identify the deflection distance of a web 108. Also, as noted above, other types of sensors (such as pressure sensors) could be used to identify the CD profile of MD tension for a web 108. As an example, the distance measurement could be made on the same surface of the web 108 as the backstep 208 or on the opposite surface. If made on the opposite surface, the position of the distance measurement can be synchronized with the position of the backstep 208 when scanning across the web 108.

Figure 5:
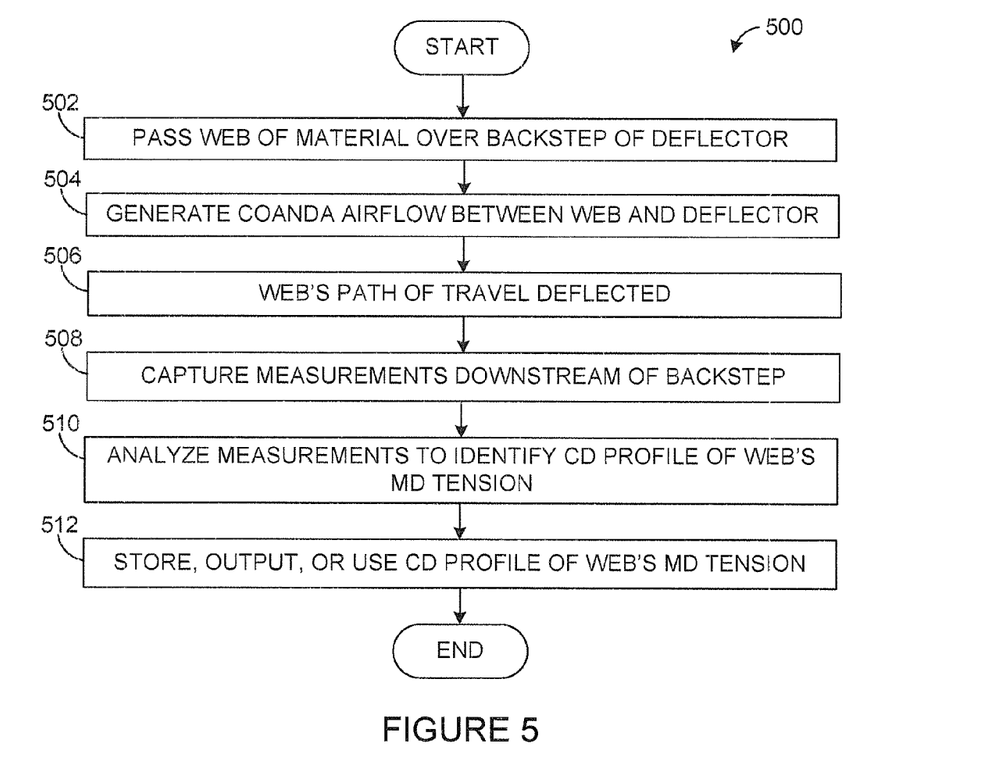
FIG. 5 illustrates an example method for measuring the CD profile of MD tension on a web according to this disclosure.

FIG. 5 illustrates an example method 500 for measuring the CD profile of MD tension on a web according to this disclosure. As shown in FIG. 5, a web of material is passed over a backstep of a deflector at step 502. This could include, for example, passing the web 108 over the backstep 208 of the deflector 202, 302. A Coanda airflow is generated between the web and the deflector at step 504. This could include, for example, the air supply 250 providing a substantially constant airflow through the slot 210 of the deflector 202, 302. This deflects the path of the web at step 506. This could include, for example, the web 108 moving closer to the deflector 202, 302 in the region downstream of the backstep 208.

Measurements downstream of the backstep are captured at step 508. This could include, for example, the sensors 252, 352 capturing pressure, deflection distance, or other measurements at one or more measurement taps 212, 312. This could also include the sensors 252, 352 moving back and forth over the web 108 within the scanning head or sensor carriage 258 while capturing the measurements. As a particular example, this could include the sensor 400 projecting a line 406 or other image onto the web 108 and identifying one or more distances to the web 108 at one or more locations.

The measurements are analyzed to identify a CD profile of the MD tension on the web at step 510. This could include, for example, the processing device 254 identifying variations in the pressure, deflection distance, or other measurements across the width of the web 108. These variations are indicative of variations in the tension on the web 108. This could also include the processing device 254 identifying the actual tension at different locations of the web 108.

The CD profile of the MD tension is stored, output, or used in any suitable manner at step 512. For example, the processing device 254 could output the CD profile to the controller 104, such as via an interface 256, for use in controlling operations of the machine 102. The processing device 254 could also execute control logic that uses the CD profile to adjust the machine 102. The CD profile could be used in any suitable manner.

Although FIG. 5 illustrates one example of a method 500 for measuring the CD profile of MD tension on a web, various changes may be made to FIG. 5. For example, while shown as a series of steps, various steps in FIG. 5 could overlap, occur in parallel, occur in a different order, or occur any number of times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit" and "receive," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Various values are given above, such as angles or distances. These values are approximate values only.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   passing a web of material over a deflector comprising a backstep, the backstep causing the web to deflect towards the deflector;
   capturing measurements of one or more characteristics associated with the web at one or more locations downstream of the backstep; and
   identifying a cross direction (CD) profile of machine direction (MD) tension on the web using the measurements.

2. The method of claim 1, further comprising:
   generating a Coanda airflow between the web and the deflector.

3. The method of claim 2, wherein generating the Coanda airflow comprises supplying air to a slot in the deflector, the slot located upstream of the backstep.

4. The method of claim 1, wherein capturing the measurements comprises capturing the measurements using at least one measurement tap through the deflector, the at least one measurement tap located downstream of the backstep.

5. The method of claim 4, wherein the at least one measurement tap comprises multiple measurement taps, different measurement taps located at different distances from the backstep.

6. The method of claim 1, wherein capturing the measurements comprises capturing pressure measurements identifying air pressures in a space between the web and the deflector.

7. The method of claim 1, wherein capturing the measurements comprises capturing deflection distance measurements identifying distances by which the web is deflected towards the deflector.

8. The method of claim 1, wherein identifying the CD profile of MD tension on the web comprises:
   identifying variations in the MD tension on the web across a width of the web.

9. The method of claim 1, wherein identifying the CD profile of MD tension on the web comprises:
   identifying absolute MD tension on the web in different locations across a width of the web.

10. An apparatus comprising:
    a deflector comprising first and second portions having different heights and separated by a backstep, the backstep configured to cause a web of material to deflect towards the deflector when passing over the deflector;
    the deflector also comprising a slot through the first portion of the deflector, the slot configured to deliver an airflow between the web and the deflector;
    the deflector further comprising at least one measurement tap through the second portion of the deflector, the at least one measurement tap configured to allow at least one sensor to capture measurements of one or more characteristics associated with the web.

11. The apparatus of claim 10, wherein the at least one measurement tap comprises multiple measurement taps, different measurement taps located at different distances from the backstep.

12. The apparatus of claim 10, wherein the slot in the first portion is substantially parallel with the backstep.

13. The apparatus of claim 10, wherein:
    the slot follows a path that is at an oblique angle with respect to top and bottom surfaces of the first portion; and
    the at least one measurement tap follows a path that is at a right angle with respect to top and bottom surfaces of the second portion.

14. The apparatus of claim 10, wherein an output end of the slot is located within about 1.0 cm of the backstep.

15. A system comprising:
    a deflector comprising:
       first and second portions having different heights and separated by a backstep, the backstep configured to cause a web of material to deflect towards the deflector when passing over the deflector;
       a slot through the first portion of the deflector, the slot configured to deliver an airflow between the web and the deflector; and
       at least one measurement tap through the second portion of the deflector; and
    at least one sensor configured to capture measurements of one or more characteristics associated with the web through the at least one measurement tap.

16. The system of claim 15, further comprising:
    an air source configured to generate the airflow between the web and the deflector through the slot.

17. The system of claim 15, further comprising:
    at least one processing device configured to receive the measurements from the at least one sensor and to identify a cross direction (CD) profile of machine direction (MD) tension on the web using the measurements.

18. The system of claim 17, wherein the CD profile of MD tension on the web comprises at least one of:
    variations in the MD tension on the web across a width of the web; and
    absolute MD tension on the web in different locations across the width of the web.

19. The system of claim 15, wherein the at least one sensor comprises at least one of:
    one or more pressure sensors configured to measure air pressures in a space between the web and the deflector; and
    one or more distance sensors configured to measure distances by which the web is deflected towards the deflector.

20. The system of claim 15, wherein:
    the at least one sensor comprises a projector configured to project a pattern onto the web and an imager configured to capture an image of at least part of the pattern on the web; and at least one processing device is configured to identify one or more distances to the web at one or more locations.

\* \* \* \* \*